United States Patent [19]
Dominick et al.

[11] Patent Number: 5,397,686
[45] Date of Patent: Mar. 14, 1995

[54] LASER MARKING SYSTEM AND METHOD FOR TEMPORARILY MARKING A SURFACE

[75] Inventors: Glenn E. Dominick, Buena Park, Calif.; William R. Ehrgott, Seattle, Wash.

[73] Assignee: Northrop Grumman Corporation, Los Angeles, Calif.

[21] Appl. No.: 34,333

[22] Filed: Mar. 22, 1993

[51] Int. Cl.⁶ .......................... G03C 5/56; G01D 15/14
[52] U.S. Cl. .................................. 430/346; 430/347; 430/332; 430/945; 427/554; 347/225
[58] Field of Search ............... 346/76 L; 430/346, 347, 430/945, 332, 338, 341; 359/652, 653, 654; 427/554, 555

[56] References Cited

U.S. PATENT DOCUMENTS

| | | | |
|---|---|---|---|
| 3,657,510 | 4/1972 | Rothrock | 219/121 LA |
| 3,740,761 | 6/1973 | Fechter | 346/76 L |
| 3,747,117 | 7/1973 | Fechter | 346/1 |
| 3,906,510 | 9/1975 | Hattori et al. | 346/1 |
| 4,148,057 | 4/1979 | Jesse | 358/4 |
| 4,264,986 | 4/1981 | Willis | 365/124 |
| 4,307,047 | 12/1981 | Edinger et al. | 264/25 |
| 4,401,992 | 8/1983 | Vorst et al. | 346/76 L |
| 4,412,229 | 10/1983 | Wada et al. | 346/108 |
| 4,547,649 | 10/1985 | Butt et al. | 219/121 LF |
| 4,668,053 | 5/1987 | Nishi et al. | 359/654 |
| 4,769,310 | 9/1988 | Gugger et al. | 430/346 |
| 4,822,987 | 4/1989 | Goldenfield et al. | 235/462 |
| 5,030,551 | 7/1991 | Herren et al. | 430/495 |
| 5,035,983 | 7/1991 | Kivonari et al. | 430/346 |

FOREIGN PATENT DOCUMENTS

| | | | |
|---|---|---|---|
| 1-003664 | 1/1989 | Japan | 430/945 |

*Primary Examiner*—Charles L. Bowers, Jr.
*Assistant Examiner*—John A. McPherson
*Attorney, Agent, or Firm*—Terry J. Anderson; Karl J. Hoch, Jr.

[57] ABSTRACT

A method for temporarily marking a surface whose distance from a light beam source can substantially vary, without requiring focusing or refocusing of the light beam, commences with the step of coating a portion of the surface with a light reactant, color-forming chemical solution. The solution is soluble in a liquid solvent that is nonreactive with the surface. The coated portion of the surface is exposed to a collimated, nonfocused laser beam exhibiting an airy disk pattern having central bright spot, the exposure occurring for a period of time that enables the central bright spot to expose the coating and to manifest a color change at points of incidence. The bright spot exhibits a diameter that does not exceed a predetermined diameter within an expected distance variations between the source of the laser beam and the surface. A laser source employs a gradient index lens to produce the airy disk diffraction pattern with a central bright spot that manifests more than 50% of the energy of a collimated beam emanating from the laser source.

13 Claims, 1 Drawing Sheet

LASER MARKING SYSTEM AND METHOD FOR TEMPORARILY MARKING A SURFACE

FIELD OF THE INVENTION

This invention relates to a system and method that employs a laser to make non-permanent marks on a surface, and more particularly, to such a method and apparatus for rendering thin, accurately placed lines on a surface.

BACKGROUND OF THE INVENTION

During manufacture of large structures, it is often necessary to accurately align portions of the structure. In the construction of aircraft, many physical alignments are required, often between portions of the airframe that are substantially displaced from each other. The distance between alignment points can vary from several feet to 40 feet or more. Such alignments must be extremely precise and require the rendering of extremely fine lines or points to achieve required tolerances. Notwithstanding the importance of accurate positioning and small size of required alignment marks, it is important to be able to easily remove the marks once the alignment process is completed.

Laser systems have been employed to remotely mark structures. Where fine markings are required, the prior art teaches various focusing techniques so as to enable a laser's beam pattern to be compressed to a fine point. Such focusing is time consuming and is to be avoided if possible. In U.S. Pat. No. 4,148,057 to Jesse, an ultraviolet laser is employed to cure an ink that has been coated on a large surface. The ink (resin) is rolled, brushed or sprayed onto the surface being marked and subsequently illuminated by a laser beam in a predetermined pattern. After the surface is washed, a raised mark is present on the path that the laser beam followed. U.S. Pat. No. 4,547,649 to Butt et al. discloses a laser-heat based system wherein a surface oxide is heated to approximately 1200° F. The heated portion of the surface oxide returns to the base metal state and contrasts with the remaining surface oxide layer. Such a technique enables superficial marking of zirconium and certain other metals.

U.S. Pat. No. 4,307,047 to Edinger et al. is a further laser-heat based system wherein a plastic object is mixed with another material that upon localized heating, changes color. The laser is controlled to create numbers, letters and other permanent markings thereon.

U.S. Pat. No. 3,657,510 to Rothrock discloses a laser marking system wherein a mask is employed to shape a laser beam to create a desired pattern on the receiving surface. The laser beam causes mechanical changes in the target surface to create the desired mark.

U.S. Pat. No. 4,401,992 to Vorst et al. also discloses a mask for shaping a laser beam. The masked laser beam causes a material containing a dye to decompose and form a color contrast mark on the surface being marked. The material being marked is described as a colored synthetic resin.

U.S. Pat. No. 5,035,983 to Kiyonari et al. describes a composition useful in a laser marking system. The composition contains a non-black inorganic lead compound and a resin. A laser, having a wavelength in the far infrared region, exposes the material and causes the appearance of a black mark. The far infrared laser regime is said to be required due to the heat resistance of the lead compound. U.S. Pat. Nos. 4,769,310 to Gugger et al. and 5,030,551 to Herren et al. both disclose the marking of ceramic materials, glazes, etc. using a laser beam. Both patents describe the rendering of permanent marks in or on a ceramic material or glaze through the use of the laser beam. U.S. Pat. No. 3,747,117 to Fechter employs a laser to expose a metal oxide coatings as to create spots having greater light permeability than the unexposed portions of the oxide. The oxide medium is described as a layer of oxidized aluminum into which a dye solution has been diffused so as to color the oxide. U.S. Pat. No. 4,822,987 to Goldenfield et al. describes a marking method that employs a computer controlled laser to engrave or etch a bar code onto nuclear fuel rods. This process, as well as most if not all of the above noted processes, leaves permanent marks on the surface.

Accordingly, it is an object of this invention to provide an improved laser marking system wherein a surface is marked with non-permanent indicia.

It is another object of this invention to provide an improved laser marking system wherein a fine marking beam pattern is achieved without the requirement of focusing optics.

It is yet another object of this invention to provide an improved laser marking system wherein a surface to be marked may be placed at varying distances from a laser exposure device without any requirement for focusing or refocusing of the laser beam.

It is still another object of this invention to provide a laser marking system wherein a temporary, light responsive medium may be coated on a surface to be marked and later removed from the surface without leaving a marking residue.

SUMMARY OF THE INVENTION

A method for temporarily marking a surface whose distance from a light beam source can substantially vary, without requiring focusing or refocusing of the light beam, commences with the step of coating a portion of the surface with a light reactant, color-forming chemical solution. The solution is soluble in a liquid solvent that is nonreactive with the surface. The coated portion of the surface is exposed to a collimated, non-focused laser beam exhibiting an airy disk pattern having central bright spot, the exposure occurring for a period of time that enables the central bright spot to expose the coating and to manifest a color change at points of incidence. The bright spot exhibits a diameter that does not exceed a predetermined diameter within an expected distance variations between the source of the laser beam and the surface. The coating is removed by an application of a solvent to the surface. A laser source employs a gradient index lens to produce the airy disk diffraction pattern with a central bright spot that manifests more than 50% of the energy of a collimated beam emanating from the laser source.

DETAILED DESCRIPTION OF THE INVENTION

Figure 1:
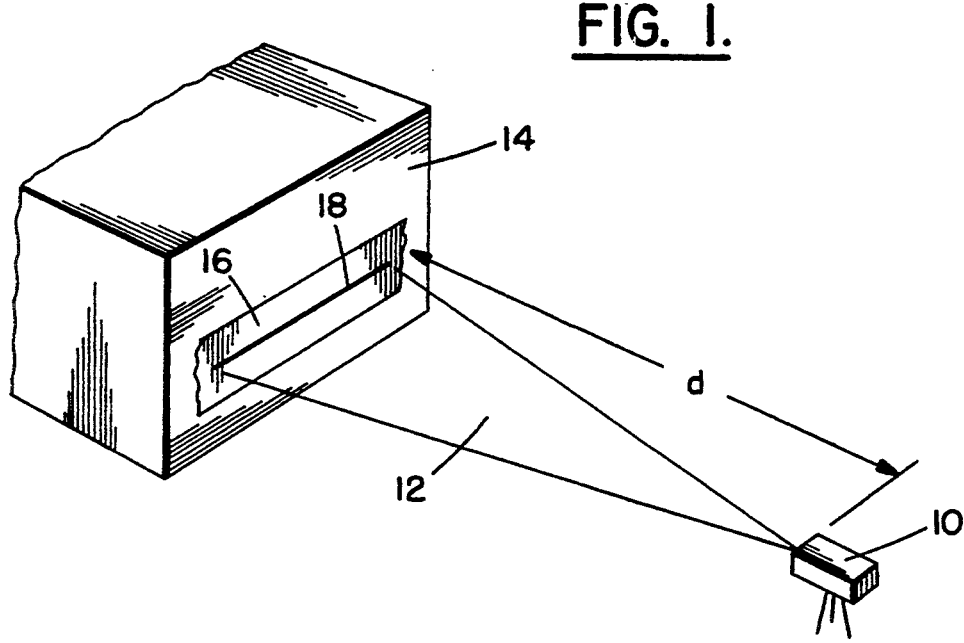
FIG. 1 is a perspective view illustrating the invention.

Referring to FIG. 1, a laser source 10 produces a scanned, collimated beam 12 that is employed to mark a surface 14. Surface 14 has been previously coated with a photosensitive coating 16 that exhibits a color change when exposed to laser beam 12. As laser beam 12 is scanned, a line 18 is produced having a desired level of line thickness.

Because, in practice, laser source 10 may be placed at varying distances (d) from surface 14, beam 12 must exhibit a relatively constant diameter over distance d so as to enable the thickness of line 18 to remain at or less than a predetermined dimension. It is thereby desirable that beam 12 not be a "focused" beam whose focal point needs adjustment each time the distance d between laser source 10 and surface 14 is altered. Additionally, once line 18 is employed for its alignment or other purpose, it is desired that it be removable from surface 14 in such a manner so as to leave surface 14 unaffected.

The above requirements are achieved by employing a coating material 16 that is photosensitive and may be totally removed from surface 14 by a solvent that is nonreactive with surface 14. Furthermore, coating material 16 need only manifest line 18 for a period of time during which line 18 is employed for its intended purpose, generally a matter of hours or less.

A preferred light reactant chemical mixture for use as coating 16 is a mixture of aqueous solutions of potassium ferricyanide and ferric ammonium citrate. A preferred such mixture comprises a 16% aqueous solution of potassium ferricyanide and a 20% aqueous solution of ferric ammonium citrate. Both aqueous solutions are combined on a 1:1 basis by volume just prior to use. Both chemicals are light sensitive and should be kept in dark bottles until ready for use.

After mixing, surface 14 is coated with the solution by using a brush or swab. The mixture is then allowed to dry while surface 14, preferably, is maintained in an area of low ambient light to prevent pre-exposure of coating 16. When dry, coating 16 is then exposed to a scanned laser beam 12. The exposed area darkens to a dark blue color. When exposed to ordinary ambient light in a normally lighted room, coating 16 will maintain the contrast between the exposed and nonexposed areas of coating 16 for a number of hours (e.g., at least six), after which nonexposed areas turn to the dark blue color. A period of several or more hours under normal circumstances, is generally sufficient to enable use of scan line 18 for its intended purpose.

After use coating 16 may easily be removed from surface 14 by either a water or alcohol wash. The solvent employed to remove coating 16 should be nonreactive with surface 14 (such as water and alcohol). While less preferred, other light reactant color-forming chemical mixtures can be employed in lieu of a potassium ferricyanide—ferric ammonium citrate mixture described above. Any light reactive material so used must be removable from surface 14 through the use of a solvent which is nonreactive with surface 14 and should exhibit a contrast that remains for hours after exposure. Such a chemical may be methylene blue, which is sensitive to red laser light in the 632.8 nM range, a wavelength produced by a helium neon laser or a laser diode). Methylene blue can be mixed in a gelatin, polyvinyl alcohol or other electron-donor material, and can be brushed, rolled, or wiped on. Methylene blue upon exposure, gives a colorless line on a blue background. After a few hours, the colorless line disappears and can be scanned again. Methylene blue can be removed with solvents, and in some cases soapy water.

Due to the fact that various applications of the system shown in FIG. 1 require that laser source 10 be positioned at different distances d from a surface being exposed, it is desirable that beam 12 exhibit a "beam" diameter that is constant over distance d so as to assure that scan line 18 exhibits a constant thickness dimension irrespective of distance d. For instance, in certain cases it is preferred that beam 12 exhibit a diameter of less than 20 thousands of an inch over a range of distances d that varies between two feet to forty feet. The constancy of beam diameter is to be maintained without a need for a refocusing if laser source 10 is moved within distance d.

While a number of beam-shaping and beam-conditioning techniques are known in the prior art, a beam exhibiting a divergence in diameter between 0.015 inches to 0.020 inches over 40 feet implies a beam divergence 0.01 milliradians. This is an order of magnitude less than the best achievable laser beams. If focusing systems were employed, a long focal length lens would be needed.

Figure 2:
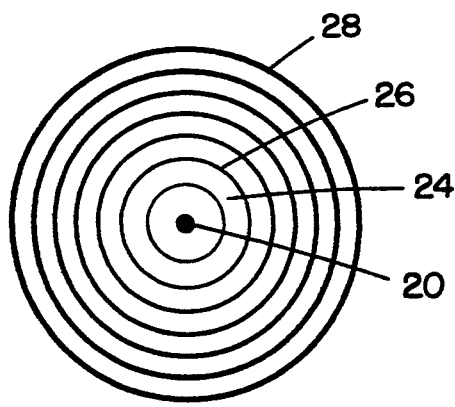
FIG. 2 is a schematic showing of an airy disk pattern produced by the laser system described herein.

Such a prior art lens structure is avoided by causing beam 12 to have an airy disk diffraction pattern. Such an airy disk pattern is shown in FIG. 2 and comprises a bright central spot 20 surrounded by alternating bright and dark rings 24 and 26. Those rings are the result of constructive and destructive interferences of diffracted rays. In an airy disk pattern, a great portion of the luminous energy of the output laser beam is concentrated in central bright spot 20 and in outer ring 28. The exact shape and energy distribution within an airy disk is largely dependent upon lenses and diffraction apertures employed in laser source 10. By proper adjustment of the lenses employed to produce the airy disk pattern, central bright spot 20 can exhibit as much as 80% of the light energy, with the remaining energy dispersed over a large number of very faint rings.

When an airy disk pattern is scanned, e.g., by a rotating mirror, the amount of light present in the rings is scarcely noticeable, while scanned central spot 20 appears very small and quite bright. For instance, at measured distances of between 5 feet and 40 feet, an airy disk pattern outer diameter can vary from 0.51 inches to 0.72 inches. However, the diameter of central bright spot 20 varies only between 0.015 inches to 0.02 inches.

Figure 3:
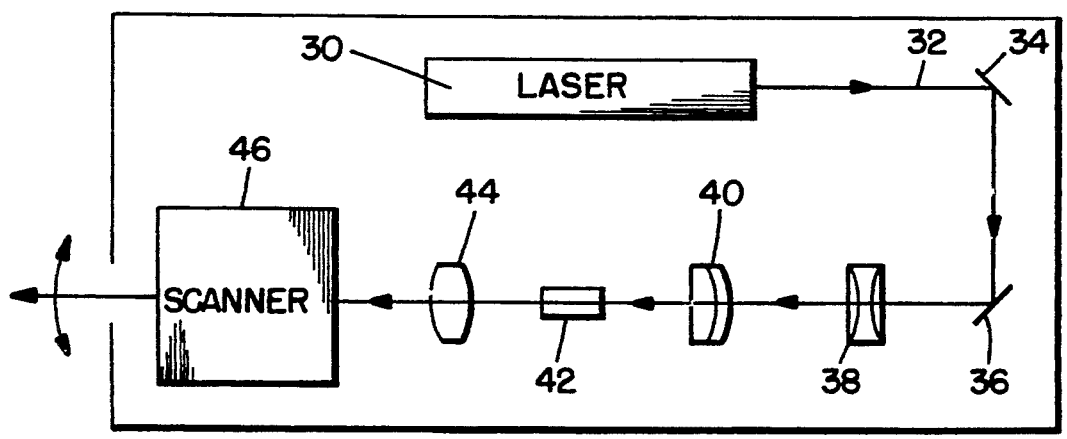
FIG. 3 is a schematic diagram of a laser system that produces a collimated laser beam exhibiting an airy disk pattern, wherein the central spot of the pattern exhibits a narrow, controlled diameter over an extended distance from the laser source.

Referring to FIG. 3, a lens arrangement within laser source 10 is illustrated that enables production of a scanned airy disk pattern (as shown in FIG. 2). Laser 30 is a Neodymium-YAG laser that preferably produces a 532 nanometer wavelength beam having a power of approximately 40 milliwatts CW. The laser beam is directed by mirrors 34 and 36 through a concave/concave lens 38 and a plano-concave lens combination 40. Together, lenses 38 and 40 comprise a reversed Galilean telescope. Lenses 38 and 40 also combine to reduce divergence of the laser beam and produce a collimated output beam. The collimated beam is passed to a gradient index lens (GRIN) 42 and a biconvex lens 44. GRIN lens 42, in the known manner, produces an airy disk diffraction pattern as shown in FIG. 2. A scanner mechanism 46 scans the resultant airy disk pattern to provide scanned output beam 12. Scanner mechanism 46 may be a moving prism, rotating mirror structure, or any other beam movement mechanism that enables the production of scanned output beam 12.

The wavelength of laser 30 should be matched to the optical photo sensitivity range of coating material 16 (FIG. 1). The 532 nanometer wavelength output of laser 30 is well matched to the optical sensitivity range of a potassium ferricyanide/ferric ammonium citrate mixture. If another photo sensitive mixture is employed, the output wavelength of laser 30 should be matched to the photo sensitivity range thereof.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

We claim:

1. A method for temporarily marking a surface using a laser beam source, said laser beam source adapted to be placed at various distances from said surface, said method comprising the steps of:

coating at least a portion of said surface with a light reactive color-forming chemical solution, said solution soluble in a liquid solvent that is nonreactive with said surface;

exposing said coated portion of said surface to a collimated, non-focused laser beam that exhibits an airy disk pattern with a central bright spot, said exposing occurring for a period of time that enables said central bright spot to expose said coating so that it manifests a color change at points of incidence of said spot, said spot exhibiting a diameter that does not exceed a predetermined limit within said various distances between said surface and said laser beam source.

2. The method as recited in claim 1 further comprising the step of:

removing said coating subsequent to a period of use through application of a said solvent to said surface.

3. The method as recited in claim 1, wherein said coated portion, after exposure by said incident laser beam, further reacts over a period measured in hours to ambient light to manifest said color change in areas not exposed to said laser beam.

4. The method as recited in claim 1, wherein said chemical solution comprises a mixture containing potassium ferricyanide and ferric ammonium citrate.

5. The method as recited in claim 4, wherein said mixture includes equal components of aqueous solutions of said potassium ferricyanide and ferric ammonium citrate.

6. The method as recited in claim 4, wherein said solvent is selected from the groups consisting of: water and alcohol.

7. The method as recited in claim 1, wherein said bright spot diameter does not exceed 0.02 inches over a distance of 2 to 40 feet.

8. The method as recited in claim 1 wherein said chemical solution comprises methylene blue.

9. A system for placing a temporary mark on a surface, said surface coated with a light reactive, color-forming chemical mixture, said mixture soluble in a solvent that is nonreactive with said surface, said system comprising:

means for coating at least a portion of said surface with said light reactive, color-forming chemical mixture;

laser means for generating a collimated beam of light for photo exposing said chemical mixture coating, said laser means including a laser and gradient index lens means for modifying said collimated beam of light to manifest an airy disk diffraction pattern including a central bright spot surrounded by bright and dark rings, said central bright spot including more than 50% of energy manifested by said collimated beam;

means for scanning said collimated beam across said coated surface so as to expose a portion thereof to a scanned said central bright spot so as to create a color change in said coated surface coincident with a path taken by said scanned central bright spot; and, means for applying said solvent to said coated surface subsequent to a period of use, whereby said chemical mixture coated on said coated portion is removed from said surface.

10. The system as recited in claim 9, wherein said chemical mixture comprises potassium ferricyanide and ferric ammonium citrate.

11. The system as recited in claim 9, wherein said chemical mixture comprises methylene blue.

12. A method for temporarily marking a surface, comprising the steps of:

providing a light-reactive color-forming chemical mixture, said mixture being soluble in a liquid solvent that is non-reactive with said surface;

coating at least a portion of said surface with said mixture;

providing a laser means for generating a collimated beam of light, said laser means including a laser and lens means for adapting said collimated beam of light to manifest an airy disk diffraction pattern, said diffraction pattern having a central bright spot surrounded by alternating bright and dark rings, said central bright spot exhibiting a diameter which does not exceed a predetermined diameter at a distance from said laser means between a minimum distance and a maximum distance;

providing a means for scanning said collimated beam of light across said coated surface;

positioning said laser means and said means for scanning at a predetermined distance from said surface, said predetermined distance being between said minimum distance and said maximum distance;

operating said laser means to generate said collimated beam of light;

scanning said collimated beam of light in a path across said coated portion of said surface, said coated mixture being exposed to said central bright spot upon said scanning, said coated mixture manifesting a color change upon said exposure at points of incidence of said central bright spot on said coated mixture along said path, whereby said surface is marked; and, applying said solvent to said coated surface subsequent to a period of use, whereby said coated mixture is removed from said surface.

13. A system for temporarily marking a surface, comprising:

means for coating at least a portion of said surface with a light-reactive color-forming chemical mixture, said mixture being soluble in a liquid solvent that is non-reactive with said surface;

laser means for generating a collimated beam of light, said laser means including a laser and lens means for adapting said collimated beam of light to manifest an airy disk diffraction pattern, said diffraction pattern having a central bright spot surrounded by alternating bright and dark rings, said central bright spot exhibiting a diameter which is less than a predetermined diameter at a distance from said laser means between a minimum distance and a maximum distance;

means for scanning said collimated beam of light in a path across said coated portion of said surface; and, means for applying said solvent to said coated surface subsequent to a period of use, whereby said chemical mixture coated on said coated portion is removed from said surface.

* * * * *